No. 688,841. Patented Dec. 17, 1901.
F. FREESE.
NUT LOCK.
(Application filed Apr. 3, 1901.)
(No Model.)
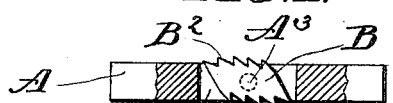
FIG. 1.
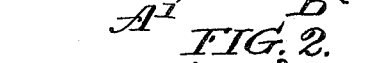
FIG. 2.
FIG. 3.
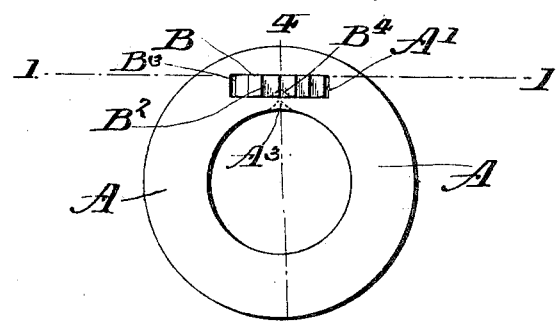
FIG. 4.
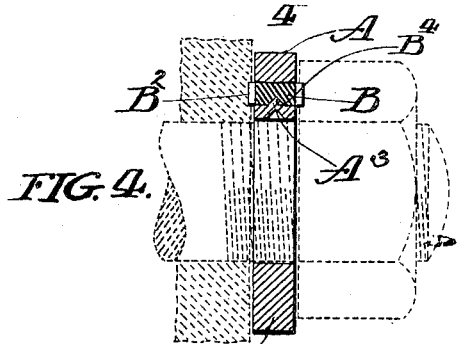
FIG. 5.
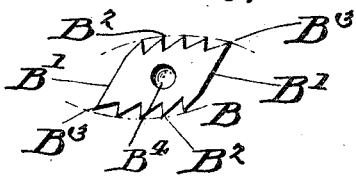
WITNESSES:
INVENTOR:
THE NORRIS PETERS CO., PHOTO-LITHO., WASHINGTON, D. C.

UNITED STATES PATENT OFFICE.

FRANK FREESE, OF PHILADELPHIA, PENNSYLVANIA, ASSIGNOR TO HIMSELF, EMIL J. BAHLS, WILLIAM F. KLING, AND WILLIAM HENDERSON, OF PHILADELPHIA, PENNSYLVANIA.

NUT-LOCK.

SPECIFICATION forming part of Letters Patent No. 688,841, dated December 17, 1901.

Application filed April 3, 1901. Serial No. 54,115. (No model.)

*To all whom it may concern:*

Be it known that I, FRANK FREESE, a citizen of the United States of America, residing in the city and county of Philadelphia, in the State of Pennsylvania, have invented certain new and useful Improvements in Nut-Locks, of which the following is a true and exact description, reference being had to the accompanying drawings, which form a part thereof.

My invention relates to the construction of nut-locks, and has for its object to provide a simple and efficient device for this purpose, my invention being, in a sense, an improvement on my device patented July 10, 1900, No. 653,228.

The nature of my improvements will best be understood as described in connection with the drawings in which they are illustrated, and in which—

Figure 1 is a side elevation of my nut-lock washer, taken on the section-line 1 1 of Fig. 3. Fig. 2 is a similar elevation showing the locking-dog moved in the direction to lock. Fig. 3 is a plan view. Fig. 4 is a section on line 4 4 of Fig. 3, showing the washer in connection with a bolt, nut, &c.; and Fig. 5 is a side elevation, on a larger scale, of the locking-dog.

A is the washer, having in my new construction a transverse slot A', with walls formed perpendicular to the faces of the washer.

B is the locking-dog, preferably of lozenge shape, as shown, but having its broad edges $B^2$ $B^2$ formed with teeth extending in substantially circular arcs, so that when the dog is turned in the direction in which its teeth point they will approach the level of the washer-faces and when turned in the opposite direction the end teeth $B^3$ $B^3$ will be forced outward into the nut and the object on the other side of the washer. The teeth and short edges B' B' of the dog are cut with their faces at substantially right angles to the faces of the dog, and at the same time that the dog is stamped out a central depression $B^4$ is formed in one face, as shown. The dog B is inserted in the slot A' of the washer and held in place by forcing a portion of the inner wall of the slot into the depression $B^4$, as shown at $A^3$.

It is obvious that the washer and dog can be made and assembled with great cheapness, and it will be readily seen that the washer when in use will permit the nut to be screwed up tight with little resistance, while a reverse movement of the nut will cause the teeth $B^3$ and those adjacent to them to bite promptly and deep into the nut, effectually preventing it from unscrewing.

Another advantage of my new construction is that while it effectually locks the nut, as above described, the dog has the capacity to turn completely over when a powerful wrench is used to unscrew the nut, the teeth of the dog biting more deeply into the nut as it is unscrewed until it, the dog, has turned to a position substantially at right angles to the washer, after which it turns back readily and practically releases all grip on the nut, which can be unscrewed without difficulty over the plane ends B' of the dog.

Having now described my invention, what I claim as new, and desire to secure by Letters Patent, is—

1. A nut-lock consisting of a washer having a slot formed through it from face to face with walls substantially perpendicular to said faces in combination with a locking-dog pivoted in said slot and having teeth on its opposite faces extending beyond the faces of the washer.

2. A nut-lock consisting of a washer having a slot formed through it from face to face with walls substantially perpendicular to said faces in combination with a locking-dog pivoted in said slot and having teeth on its opposite faces extending beyond the faces of the washer in oppositely-curved lines.

3. A nut-lock consisting of a washer having a slot formed through it from face to face with walls substantially perpendicular to said faces in combination with a locking-dog having its ends and teeth formed at right angles to its side walls said dog being pivoted in the slot of the washer and having teeth formed on its opposite edges so as to extend beyond the faces of the washer.

4. A nut-lock consisting of a washer having a slot formed through it from face to face with walls substantially perpendicular to said faces in combination with a locking-dog having its ends and teeth formed at right angles to its side walls said dog being pivoted in the slot of the washer and having teeth formed on its opposite edges so as to extend beyond the faces of the washer in oppositely-curved lines:

5. A nut-lock consisting of a washer having a slot formed through it in combination with a lozenge-shaped locking-dog pivoted in the slot and free to turn therein through an angle of approximately ninety degrees said dog having teeth formed on two of its opposite faces adapted to engage with a nut as specified.

6. A nut-lock consisting of a washer having a slot formed through it in combination with a locking-dog pivoted in the slot and free to turn therein through an angle of approximately ninety degrees said dog having teeth formed on two of its opposite faces adapted to engage with a nut as specified and its other two opposite faces made plane.

FRANK FREESE.

Witnesses:
ALBERT P. GERHARD,
LENETTE McFARLAND.